United States Patent [19]

Frankel et al.

[11] Patent Number: 4,512,025

[45] Date of Patent: Apr. 16, 1985

[54] INCREASING CAPACITY OF BASEBAND DIGITAL DATA COMMUNICATION NETWORKS

[75] Inventors: Robert S. Frankel, Centereach, N.Y.; Alexander Herman, Hertzelia, Israel

[73] Assignee: The United States of America as represented by the United States Department of Energy, Washington, D.C.

[21] Appl. No.: 443,982

[22] Filed: Nov. 23, 1982

[51] Int. Cl.³ .............................................. H04B 3/50
[52] U.S. Cl. .................................. 375/36; 340/825.5; 375/43; 455/58; 370/71
[58] Field of Search ................. 340/825.5; 375/43, 36; 455/15, 16, 47, 51, 58; 370/30, 69.1, 121, 71, 72, 124, 74

[56] References Cited

U.S. PATENT DOCUMENTS

| | | | |
|---|---|---|---|
| 2,064,907 | 12/1936 | Green | 455/16 |
| 2,105,809 | 1/1938 | Duncan | 370/121 |
| 2,388,906 | 11/1945 | Corderman | 455/51 |
| 3,089,920 | 5/1963 | Law | 455/47 |
| 3,202,762 | 8/1965 | Aaron et al. | 370/112 |
| 3,546,386 | 12/1970 | Darcey | 455/47 |
| 3,842,352 | 10/1974 | Cote | 455/52 |
| 3,914,554 | 10/1975 | Seidel | 455/47 |
| 4,384,363 | 5/1983 | Lipcon | 455/58 |

OTHER PUBLICATIONS

"A Low-Loss, Wideband Transmitter Multiplexer", Smith 1973 IEEE International Microwave Symposium, Boulder, Colorado.

Primary Examiner—Benedict V. Safourek
Attorney, Agent, or Firm—Vale P. Myles; Paul A. Gottlieb; Judson R. Hightower

[57] ABSTRACT

This invention provides broadband network capabilities for baseband digital collision detection transceiver equipment for communication between a plurality of data stations by affording simultaneous transmission of multiple channels over a broadband pass transmission link such as a coaxial cable. Thus, a fundamental carrier wave is transmitted on said link, received at local data stations and used to detect signals on different baseband channels for reception. For transmission the carrier wave typically is used for segregating a plurality of at least two transmission channels into typically single sideband upper and lower pass bands of baseband bandwidth capability adequately separated with guard bands to permit simple separation for receiving by means of pass band filters, etc.

6 Claims, 8 Drawing Figures

CARRIER AMP

RECEIVER

TRANSMITTER

LOGIC BOARD

INCREASING CAPACITY OF BASEBAND DIGITAL DATA COMMUNICATION NETWORKS

BACKGROUND OF THE INVENTION

The invention described herein was made or conceived in the course of, or under a contract with, the U.S. Department of Energy.

This invention relates to digital data communication networks and more particularly it relates to increasing the data processing capability of baseband digital data communication systems of the type set forth in the U.S. Pat. No. 4,063,220 to Robert M. Metcalfe et al., issued Dec. 13, 1977, known by the Xerox Corporation tradename "Ethernet".

The aforesaid Metcalfe patent has led to commercialized digital data communication systems between two different computers, office machines, or the like. These systems have a restricted bandwidth of communication known in the trade as baseband systems. A disadvantage of these systems with the collision prevention technique of listening for a clear channel before talking not heretofore resolved is that communications are limited to a single narrow bandwidth communication channel. This has led to alternative broadband systems which are more complex and require processing of analog data in order to offer more channels of communication. A background on these alternatives is set forth in an article by Kenneth Klee et al., entitled "Battle of the Networks" published in *Datamation*, March 1982. Thus, the state of the art is such that there only is provided a system choice between a broadband network or a single channel baseband network.

As clearly set forth in the above article, it has been heretofore deemed in the art inconsistent to adapt a digital baseband network with collision prevention means to any compatible broadband capability to process two or more signals simultaneously.

It is therefore an object of this invention to improve the digital baseband communication network art by providing broadband multiple-channel communication capabilities while retaining the advantages of collision prevention.

Other objects, features and advantages of the invention will be found throughout the following description, drawing and claims.

DISCLOSURE OF THE INVENTION

Thus in accordance with this invention a baseband digital communication network system with collision prevention means is provided for handling two or more communications simultaneously over a transmission link, thereby affording the advantages of broadband analog communication systems.

In a preferred embodiment a carrier wave is transmitted over the transmission link and serves at a data station coupled with the link to segregate both transmitted and received signals into at least two separate bands so that at least two simultaneous signal channels may be used in the network while operating with the network collision prevention means.

Thus, for example, two signal bands with appropriate guard bands therebetween (and between other signals transmitted on the link) may comprise the upper and lower single sideband transmission of the two respective bands. Such bands are separable by band filtering and demodulation by network receivers. Also transmission is readily accomplished by modulating and filtering to send only a single (upper or lower) sideband through the transmission link, which is preferably a coaxial cable, but also may comprise a radio link, optical link, etc.

Accordingly, each network data station is readily convertible to communicate with and process a plurality of at least two data bands to thereby increase the data transmission capabilities of the network as comparable with broadband network systems without collision prevention, wherein simultaneous signals may be conveyed and intercepted along the network.

THE PREFERRED EMBODIMENTS

Figure 1:
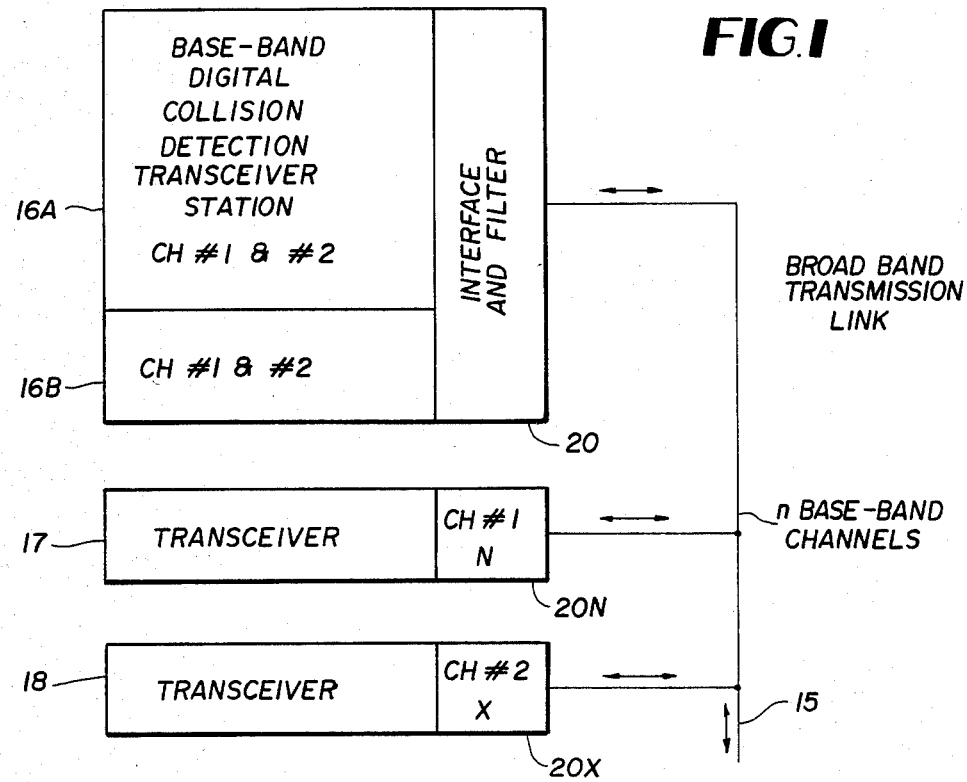
FIG. 1 is a block system diagram of a binary baseband data transmission network embodying the invention.

By reference to FIG. 1, it may be seen that a broadband transmission link 15 such as a coaxial cable, radio system or optical system serves to connect a plurality of individual data station transceivers 16A, 16B, 17, 18, etc. for communicating digital data therebetween in a baseband collision detection mode. The channel 15 bandwidth characteristic (or available spectrum band) is sufficient to carry simultaneously transmissions in a plurality of two or more (n) baseband channels between the data stations.

The state of the art heretofore has required a separate transmission channel (coaxial cable) 15 for each baseband channel and the collision detection mode limits transmission on that channel to a single message. That is, each data station in its interface equipment 20, etc. inquires to see if the channel is in use before a message is communicated to another station along the line, as set forth in the Metcalfe patent, supra.

As seen in the FIG. 1 system of this invention, however, the transmission link is afforded a mode of operation permitting more data to be processed, and faster access time, by simultaneous transmission of a plurality of baseband channels n to which the data stations 16, 17, 18, etc. have access. This also provides more system flexibility in the data stations, at the cost of some relatively simplified filtering or selection equipment as part of the interfacing 20 between the transceivers 16, 17, 18 and the transmission link 15. Thus, for example, a "busy" data station 16 may have two transceivers 16A, 16B each with the capacity to communicate on multiple channels (CH #1 and #2). Data station 17 could be a single channel station communicating on channel #1 only, and similarly station 18 could communicate on channel #2. Other stations (B to L, etc.) along the line thus can have considerable flexibility without disturbing the system mode or limiting the ability to communicate single channel wise with other stations in the manner available to the art prior to this present invention.

Figure 2:
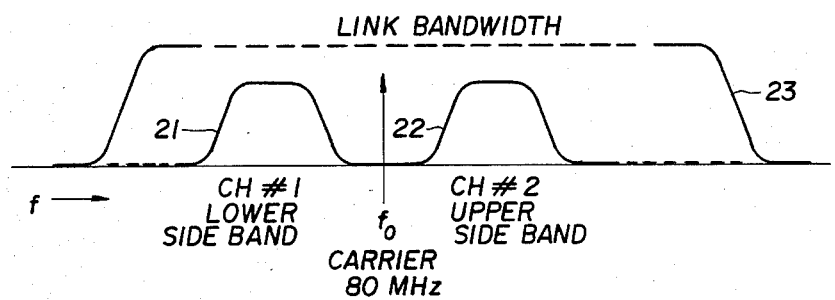
FIG. 2 is a graph with frequency as the abscissa showing the relationships of a carrier wave, two data transmission bands and a transmission channel passband characteristic as afforded by the teachings of this invention.

One specific preferred mode of operation is exemplified by the bandwidth graph of FIG. 2 drawn on a frequency (f) abcissa. Thus, typically a carrier frequency (fo) of 80 MHz is single sideband modulated with the baseband data of limited bandwidth to produce a properly guarded lower sideband first channel 21 and an upper sideband second channel 22 both falling within the transmission bandwidth 23 of the broadband transmission link. These two separate channels, CH #1 and CH #2 corresponding to notation of FIG. 1, provide the network capability of simultaneous communications not heretofore feasible with networks providing a collision prevention mode of transmission of digital signals. The treatment of data is done by state of the art modulation and multiplexing techniques, such as set forth in U.S. Pat. No. 3,202,762 to M. R. Aaron et al., Aug. 24, 1965; U.S. Pat. No. 3,842,352 to W. E. Cote, Oct. 15, 1974; and U.S. Pat. No. 3,914,554 to H. Seidel, Oct. 21, 1975. Mixing, modulating, multiplexing and filtering data at required frequency bands is achieved by simple state of the art equipment as described for example by an article published in the Digest of Technical Papers of the 1973 IEEE International Microwave Symposium at Boulder, Colo., June 4 to 6, 1973 entitled "A Low-Loss, Wideband Transmitter Multiplexer" by J. I. Smith and R. E. Fisher of Bell Laboratories. Thus, to better set forth the nature and spirit of this invention, the network features are set out in block diagram form throughout the remaining figures.

Figure 3:
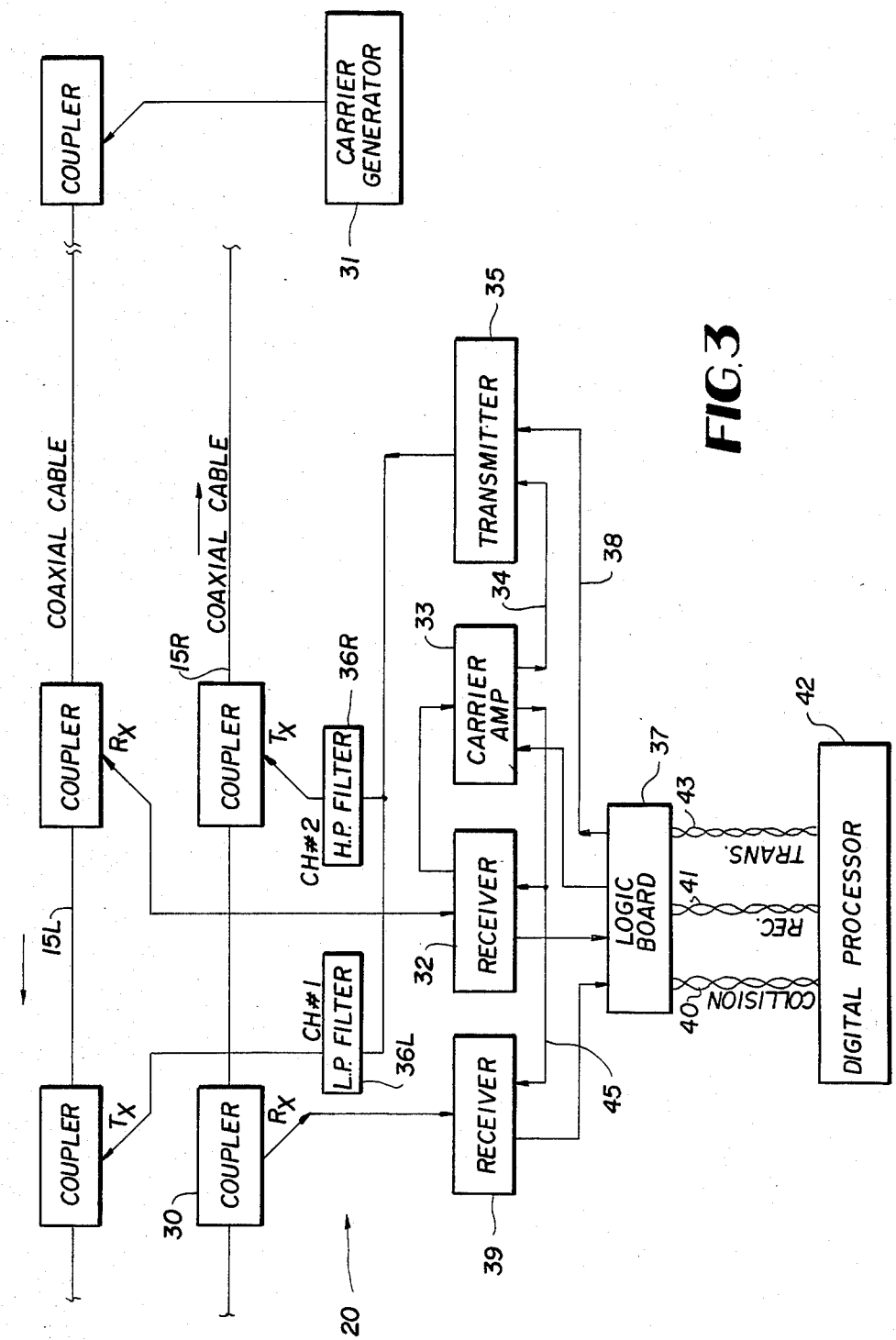
FIGS. 3 and 4 are block system diagram embodiments of a network and data processing station as afforded by this invention.

A simplified system is attained in the two cable (15L, 15R) network of FIG. 3. A coupler 30 is used for receiving (Rx) signals from the cables or transmitting (Tx) signals onto the cables from the various station units. Each cable 15L and 15R then may comprise a different data channel corresponding to the aforesaid CH #1 and CH #2. Note that a single carrier frequency generator 31 is coupled to a single cable 15L for use in the mode described in FIG. 2.

The carrier is thus detected by receiver 32 and amplified at carrier amplifier 33 for local use in transmitting and receiving operations, and in this manner may be used for synchronous relationships (if used) in the system. The single transmitter 35 then receives the carrier along lead 34 for modulation respectively of upper or lower sideband (depending upon the channel 15L or 15R accessibility) which is coupled to the respective cable by corresponding band-pass filters 36L and 36R permitting only the desired channel to enter the corresponding cable (as directed from the logic board 37 along lead 38).

Receivers 32 and 39 are coupled to the respective cables 15L, 15R in the manner described in the Metcalfe patent, supra and provide via logic board 37 the respective collision signals 40 and received data 41 to digital processor 42 for timed release of data to be transmitted 43. Clearly the digital processor has access to either of two data base channels along the respective coaxial cables 15L, 15R, thereby to give improved access time and other advantages of a broadband system while retaining the significant advantages of the collision detection mode.

In order to receive and segregate (demultiplex) the data from the respective two (or more) baseband channels (e.g. 15R, 15L), the carrier signal from amplifier 33 is carried by lead 45 to receivers 32, 39 and respectively heterodyned by state of the art techniques to detect the upper and lower sideband digital data transmitted over the link 15. The logic board 37 will then direct the selected digital data through the baseband pass receiving link of twisted pair 41 into digital processor 42.

Figure 4:
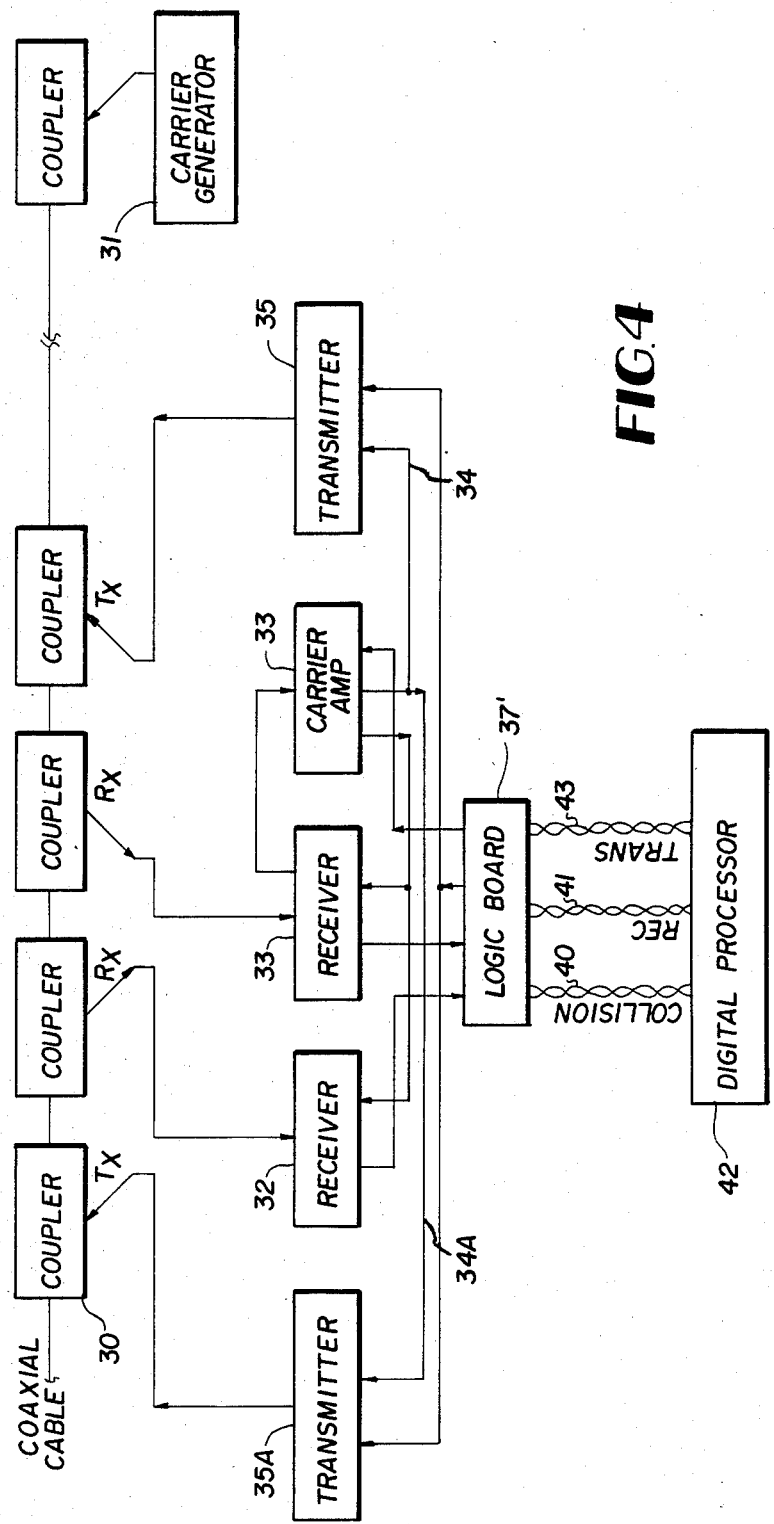

This network has advantages of simplified hardware requirements to achieve the broadband capabilities, essentially comprising: a second receiver 32, a logic board 37, a carrier amplifier 33 and filters 36 (or switching means) for coupling the transmitter 35 to a selected one of cables 15R or 15L. There is no disadvantage to the two cable connection over the state of the art since it has only been contemplated heretofore that the baseband collision-detecting digital signal is sent on each communication link at a time. However, as shown in FIG. 4, a single cable link may be used at the expense of a little more complicated logic (37') and a second transmitter 35A.

The conversion equipment for adapting the baseband collision detection network to broadband collision detection mode and capabilities is typically that set forth in FIGS. 5 to 8.

Figure 5:
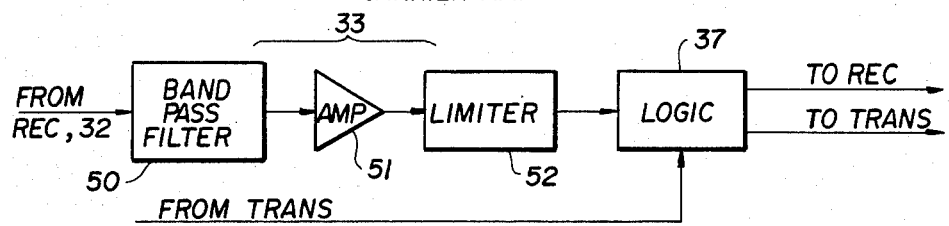
FIG. 5 is a block diagram of a carrier processing portion of the system afforded by this invention.

The carrier amplifier circuit 33 of FIG. 5, therefore serves to derive with the narrow band pass filter 50 the fundamental carrier wave (fo) from the coaxial link 15 (15L), which is amplified (51) and limited (52) before processing in logic circuit 37.

Figure 6:
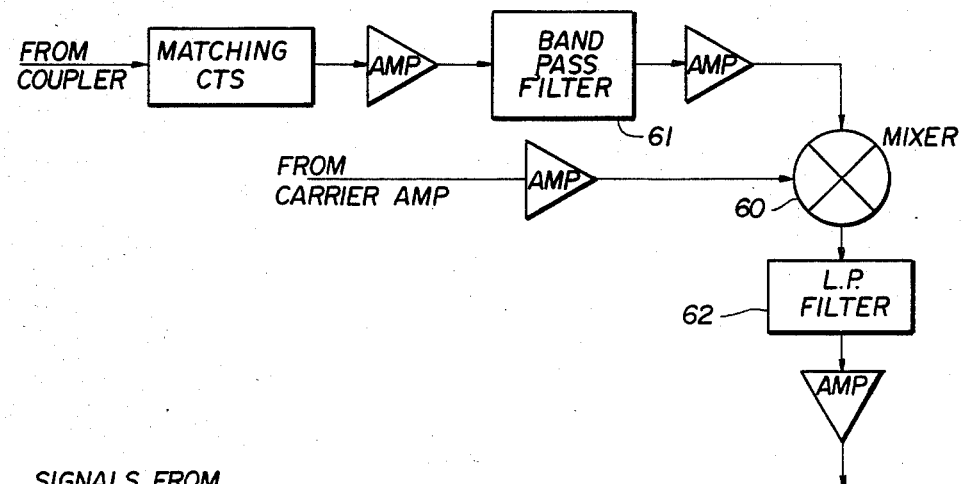
FIG. 6 is a block diagram of a signal receiving portion of the system afforded by this invention.

In FIG. 6, typical receiver input filter circuits are shown. In essence, the carrier signal is used at mixer 60 with the broadband signal from band pass filter 61 to derive the baseband signal filtered at narrow pass filter 62, e.g. a low pass filter for deriving the lower sideband of FIG. 2. The transmitter similarly in FIG. 7 mixes the carrier signal at mixer 70 lead 71 with the signals to be transmitted at lead 72, and derives the upper or lower single sideband at filter 73 for transmission.

Figure 7:
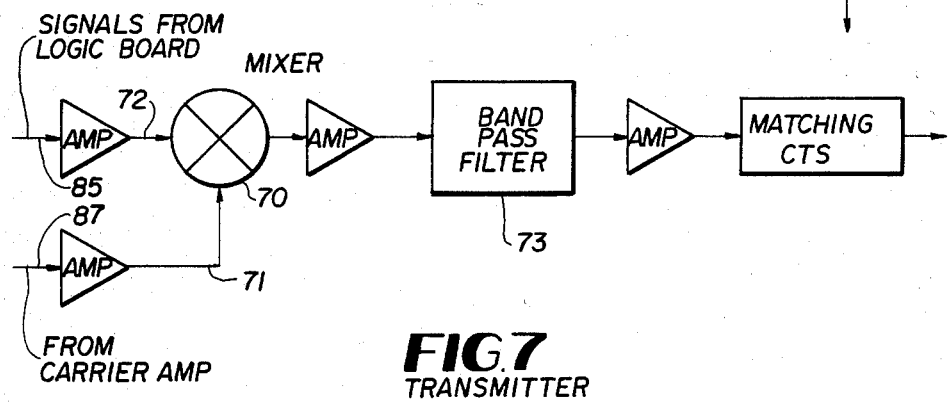
FIG. 7 is a block diagram of a signal transmitting portion of the system afforded by this invention.
Figure 8:
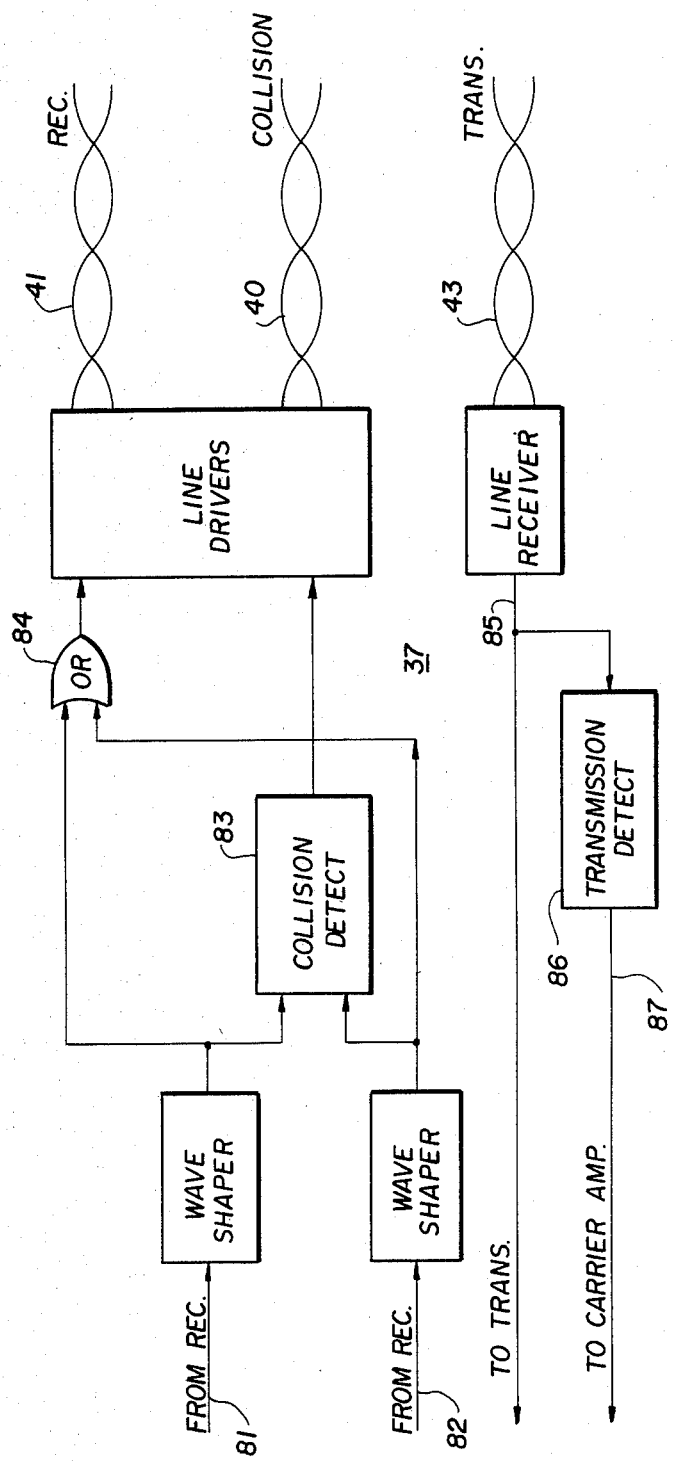
FIG. 8 is a block diagram of the interface portion of the system afforded by this invention with a baseband digital communication network of the type employing collision prevention means.

The logic board in FIG. 8 processes signals from the two receivers for the two baseband channels on lines 81, 82, through the collision detector 83 of the Metcalfe patent, supra, to derive the collision signal 40 and to pass the received digital signals through OR circuit 84 to receiver line 40. Output transmitted signals on line 85 as detected at 86 are passed to the carrier amplifier on line 87 for mixing as shown in FIG. 7.

Other variations in mixing and processing signals are within the skill of those in the art using the present state of the art. Those novel features of the invention believed descriptive of the scope and spirit of the invention are set forth with particularity in the claims.

We claim:

1. A digital data communication network system with collision prevention means including a plurality of stations using a particular assigned frequency bandwidth spectrum of a transmission link communicating digital signals between (a) said plurality of digital data stations, said collision prevention means being operable to prevenf interference by concurrent use of the same frequency by more than one of said stations, comprising in combination, means including a clear channel detector for enabling the transmitting of digital signal communications from at least two of said digital data stations respectively in separate ones of said frequency bands carried simultaneously by locally choosing one of such frequency bands within the assigned link bandwidth having a clear channel as identified by said detector, and receiving means tuned to a selected one of said separate frequency bands carried simultaneously and including collision prevention means responsive to said detector for enabling reception on a clear channel of one of said digital communications transmitted within that assigned frequency band over said transmission link.

2. A system as defined in claim 1 wherein said means for transmitting includes modulating means for modulating a carrier wave with two signals to be transmitted to produce the respective signals contained within said assigned frequency band with the carrier wave and modulated sidebands thereof being of a frequency within the transmission bandwidth of the assigned transmission line, and sideband processing means in said modulating means tuned to create separate sideband signals for said carrier wave for said two signals to be within said separate frequency bands that can be carried over said assigned transmission link without interference therebetween.

3. A system as defined in claim 2 including means for transmitting the unmodulated carrier wave into said transmission link, and means respectively in the transmitting means and detection means located at a digital data station for deriving the carrier wave from the transmission link and processing it locally for transmitting and receiving the separate frequency bands at that digital station.

4. A system as defined in claim 1 wherein said transmission link is a single coaxial cable.

5. A system as defined in claim 1 wherein said transmission link comprises two coaxial cables each adapted to communicate said digital signals between said data stations, means for transmitting signals in separate ones of said frequency bands carried simultaneously onto respective ones of the coaxial cables, and a data station coupled to both said cables to receive therefrom and transmit thereinto said digital signals and including means for selecting a respective one of said cables for a clear channel communication link to another digital station coupled thereto.

6. A system as defined in claim 5 including means for transmitting a carrier wave within the coaxial cable transmission bandwidth into a single said cable, means in said data station coupled to both cables to receive said carrier wave, and means in said data station coupled to both cables responsive to said carrier wave for respectively receiving and transmitting said digital data signals on a single one of said frequency bands.

* * * * *